US006963659B2

(12) United States Patent
Tumey et al.

(10) Patent No.: US 6,963,659 B2
(45) Date of Patent: Nov. 8, 2005

(54) FINGERPRINT VERIFICATION SYSTEM UTILIZING A FACIAL IMAGE-BASED HEURISTIC SEARCH METHOD

(75) Inventors: David M. Tumey, San Antonio, TX (US); Tianning Xu, San Antonio, TX (US); Craig Arndt, San Jose, CA (US)

(73) Assignee: FaceKey Corp., San Antonio, TX (US)

( * ) Notice: Subject to any disclaimer, the term of this patent is extended or adjusted under 35 U.S.C. 154(b) by 690 days.

(21) Appl. No.: 09/952,096

(22) Filed: Sep. 12, 2001

(65) Prior Publication Data

US 2002/0034319 A1 Mar. 21, 2002

Related U.S. Application Data

(60) Provisional application No. 60/232,924, filed on Sep. 15, 2000.

(51) Int. Cl.[7] .............................................. G06K 9/00
(52) U.S. Cl. ....................... 382/116; 382/118; 382/124; 340/5.2; 340/5.52; 340/5.53; 902/3; 713/186
(58) Field of Search ................................. 382/115–127; 340/5.1, 5.2, 5.52, 5.53; 902/3; 285/68–69; 713/186

(56) References Cited

U.S. PATENT DOCUMENTS

| | | | | |
|---|---|---|---|---|
| 4,449,189 A | * | 5/1984 | Feix et al. ................... 704/272 |
| 4,975,969 A | * | 12/1990 | Tal ............................... 382/116 |
| 4,993,068 A | * | 2/1991 | Piosenka et al. ............. 713/186 |
| 5,502,774 A | * | 3/1996 | Bellegarda et al. .......... 382/159 |
| 5,513,272 A | * | 4/1996 | Bogosian, Jr. ............... 382/116 |
| 5,991,429 A | * | 11/1999 | Coffin et al. ................. 382/118 |
| 6,317,544 B1 | * | 11/2001 | Diehl et al. .................. 385/115 |
| 6,496,594 B1 | * | 12/2002 | Prokoski ...................... 382/118 |
| 6,496,595 B1 | * | 12/2002 | Puchek et al. ............... 382/124 |

\* cited by examiner

Primary Examiner—Bhavesh M. Mehta
Assistant Examiner—Aaron Carter
(74) Attorney, Agent, or Firm—Eric Cernyar

(57) ABSTRACT

A biometric verification system for controlling access is provided that does not rely on a non-biometric discriminator, such as a PIN or magnetic card, to convert a one-to-many verification task to a one-to-one verification task. The system enrolls authorized users by obtaining digitized fingerprint templates from them and storing them in a database. Video cameras and fingerprint sensors are provided for use in authenticating persons seeking access. Software compares a digital representation of a captured human facial image with stored facial images in a database of facial images, generating a match confidence therefrom and rank-ordering the database from highest to lowest match confidence. The software then compares captured human fingerprints with stored fingerprint templates associated with the rank-ordered database to verify the identity of the person and provide an output signal indicative of recognition.

5 Claims, 7 Drawing Sheets

FINGERPRINT VERIFICATION SYSTEM UTILIZING A FACIAL IMAGE-BASED HEURISTIC SEARCH METHOD

RELATED APPLICATIONS

This Application is a continuation of Applicant's now abandoned U.S. Provisional Patent Application Ser. No. 60/232,924 filed Sep. 15, 2000. This Application claims domestic priority, under 35 U.S.C. § 119(e)(1), to the earliest filing date of Sep. 15, 2000.

FIELD OF THE INVENTION

The present invention is generally directed to a method and apparatus for recognizing human users and more particularly providing biometric security by identifying and verifying a fingerprint of an authorized human user and producing an output signal indicative of recognition or non-recognition of said human user. The present invention also relates to providing rapid identification of an individual's fingerprint in a large database of fingerprints through the use of a facial image recognition pre-processing and search ordering method. The present invention further relates to layering multiple biometric techniques for providing increased levels of security.

BACKGROUND OF THE INVENTION

In light of the myriad technological advancements that have characterized the previous decade, providing high security for computer systems and facilities has become a daunting challenge. Even as recent statistics are showing a decline in the overall violent crime rate, theft and more particularly technology related crime, has soared. The problem is costing insurance companies, and U.S. citizens, billions of dollars each year. Hackers who have successfully introduced computer viruses through email and other means have cost corporations millions if not billions of dollars in repair costs, lost work product and lost revenue. Because of this sophisticated criminal environment, many companies, government agencies and individuals alike have begun to view biometric security applications in a far more favorable light, however, biometric identification techniques (recognizing an individual based on a physiological metric), have yet to be employed either due to their complexity, invasiveness (lengthy recognition delays) or high cost.

There exists many methods for providing security against fraud and theft including conventional keys, remote keyless entry systems, key pad interfaces which require the user to enter a Personal Identification Number (PIN), alarm systems, magnetic card systems and proximity device systems. Similarly there exists many methods for the biometric identification of humans which includes facial image verification, voice recognition, iris scanning, retina imaging as well as fingerprint pattern matching.

Biometric verification systems work best when employed in a one-to-one verification mode (comparing one unknown biometric to one known biometric). When biometric verification is used in a one-to-many mode (comparing one unknown biometric to a database of known biometrics) such as one might employ in a facility security application, processing delays caused by the inefficiency of searching the entire database for a match are often unacceptable when the number of users exceeds 20 to 30 individuals. This makes most biometric applications unsuitable for larger user databases. In order to circumvent this limitation, a biometric verification algorithm is typically integrated with a non-biometric device such as a PIN keypad. The advantage to this arrangement is that a one-to-many verification scenario can be reduced to a one-to-one verification scenario by limiting the biometric comparison only to the data file associated with a particular PIN number. Thus, by inputting a PIN, the biometric algorithm is able to narrow its search within a much larger database to only one individual The disadvantage to this arrangement is of course the loss of the pure biometric architecture coupled with the inconvenience of having to administer and remember PIN numbers or maintain magnetic cards. In order for Biometric security systems to be unconditionally accepted by the marketplace, they must replace the more conventional security methods in biometric-only embodiments.

Iris and retina identification systems, although very accurate, are considered "invasive", expensive and not practical for applications where limited computer memory storage is available. Voice recognition is somewhat less invasive, however it can require excessive memory storage space for the various voice "templates" and sophisticated recognition algorithms. All three of these technologies have processing delays associated with them that make their use in one-to-many verification applications inappropriate.

Face verification systems, although non-invasive with minimal processing delays, tend to be less accurate than the methods described above. Face recognition systems can be successfully implemented for one-to-many verification applications, however, because recognition algorithms such as principal component analysis exist which permit extremely rapid searches and ordering of large databases of facial images. Due to the abundant availability of extremely fast and inexpensive microprocessors, it is not difficult to create algorithms capable of searching through more than 20,000 facial images in less than one second.

Fingerprint verification is a minimally invasive and highly accurate way to identify an individual A fingerprint verification system utilizing an integrated circuit or optically based sensor can typically scan through a large database of users at the rate of approximately one comparison per 100 milliseconds. Although this delay is acceptable for small numbers of users, delays of several seconds can be incurred when the number of users exceeds 20 to 30 individuals. For example, for an extremely large user database of 2000 individuals and assuming 100 milliseconds processing delay per individual, a worst-case verification delay could be more than three minutes. This delay would clearly be unacceptable in all but the most tolerant security applications.

The prior references are abundant with biometric verification systems that have attempted to identify an individual based on one or more physiologic metrics. Some inventors have combined more than one biometric system in an attempt to increase overall accuracy of the verification event. One of the major problems that continues to impede the acceptance of biometric verification systems is unacceptable delays associated with one-to-many verification events. To date, the only attempt directed towards reducing these unacceptable delays for biometric systems has been to add a non-biometric discriminator that converts one-to-many verification tasks to one-to-one. Although effective, combining biometric and non-biometric systems is not desirable for the reasons stated herein above.

Although many inventors have devised myriad approaches attempting to provide inexpensive, minimally invasive, and fast fingerprint verification systems in which fingerprints of human users could be stored, retrieved and compared at some later time to verify that a human user is indeed a properly authorized user, none have succeeded in producing a system that is practical and desirable for use in security applications requiring one-to-many biometric verification. Because of these and other significant imitations, commercially viable biometric-based security systems have slow in coming to market.

The present invention overcomes all of the aforesaid imitations by combining a very fast and streamlined facial image-based search engine with state-of-the-art fingerprint verification algorithms. The present invention allows fingerprint verification analysis to be utilized in one-to-many applications by first reducing the problem to one-to-few. The facial image-based search engine can rapidly order a user database which then permits the fingerprint verification engine to search in a heuristic fashion. Often, after a database has been so organized based on facial image recognition, less than 10 fingerprint comparisons are necessary to find the authorized user. In reference to the example described herein above, even with a 2000 user database, the fingerprint algorithm would only need to compare ten individual fingerprints to find a match. Thus instead of a 3 minute processing delay, any given individual in the database would likely only experience a one second processing delay. This novel utilization of one biometric to provide a heuristic search method for another biometric allows the creation of a truly practical "pure" biometric security system

SUMMARY OF THE INVENTION

It is an object of the present invention to improve the apparatus and method for providing biometric security.

It is another object of the present invention to improve the apparatus and method for verifying an individual fingerprint of a human user in a large database of users.

Accordingly, one embodiment of the present invention is directed to a fingerprint verification system utilizing a facial image-based heuristic search method which includes a first computer-based device having stored thereon encoded first human fingerprint biometric data representative of an authorized human user, an integrated circuit-based or optically-based fingerprint sensor for gathering said first fingerprint data, a control device with display and keyboard for enrolling said authorized human user, a second computer-based device located remotely from said first computer-based device for providing verification of said authorized human user, a network for communicating data between said first computer-based device and said second computer-based device, a receptacle or the like associated with said second computer-based device having embedded therein an integrated circuit-based or optically-based fingerprint sensor for real-time gathering of second human fingerprint biometric data, a video camera and digitizer associated with said second computer-based device for real-time gathering of human facial image data, and software resident within said second computer-based device, which can include minutiae analysis, principal component analysis, neural networks or other equivalent algorithms, for comparing said first human biometric data with said second human biometric data and producing an output signal therefrom for use in the verification of said human user. The apparatus may optionally include an electronic interface for controlling a security system which can be enabled or disabled based on whether or not said human user's biometric data is verified by said biometric verification algorithms.

Another embodiment of the present invention is directed to a method for layering biometrics wherein facial image recognition is utilized in a one-to-many mode to order the said user database enabling a heuristic search for fingerprint matching, and subsequently re-utilizing facial image verification in a one-to-one mode to confirm the fingerprint verification. This arrangement has the dual advantage of decreasing processing delay and increasing overall security by ameliorating false acceptance rates for unauthorized users. The method is further characterized as using a computer-based device to perform the steps of the invention.

Other objects and advantages will be readily apparent to those of ordinary skill in the art upon viewing the drawings and reading the detailed description hereinafter.

DETAILED DESCRIPTION OF THE PREFERRED EMBODIMENT

Although those of ordinary skill in the art will readily recognize many alternative embodiments, especially in light of the illustrations provided herein, this detailed description is of the preferred embodiment of the present invention, an apparatus and method for providing fingerprint verification utilizing a facial image-based heuristic search paradigm, the scope of which is limited only by the claims appended hereto.

Figure 1:
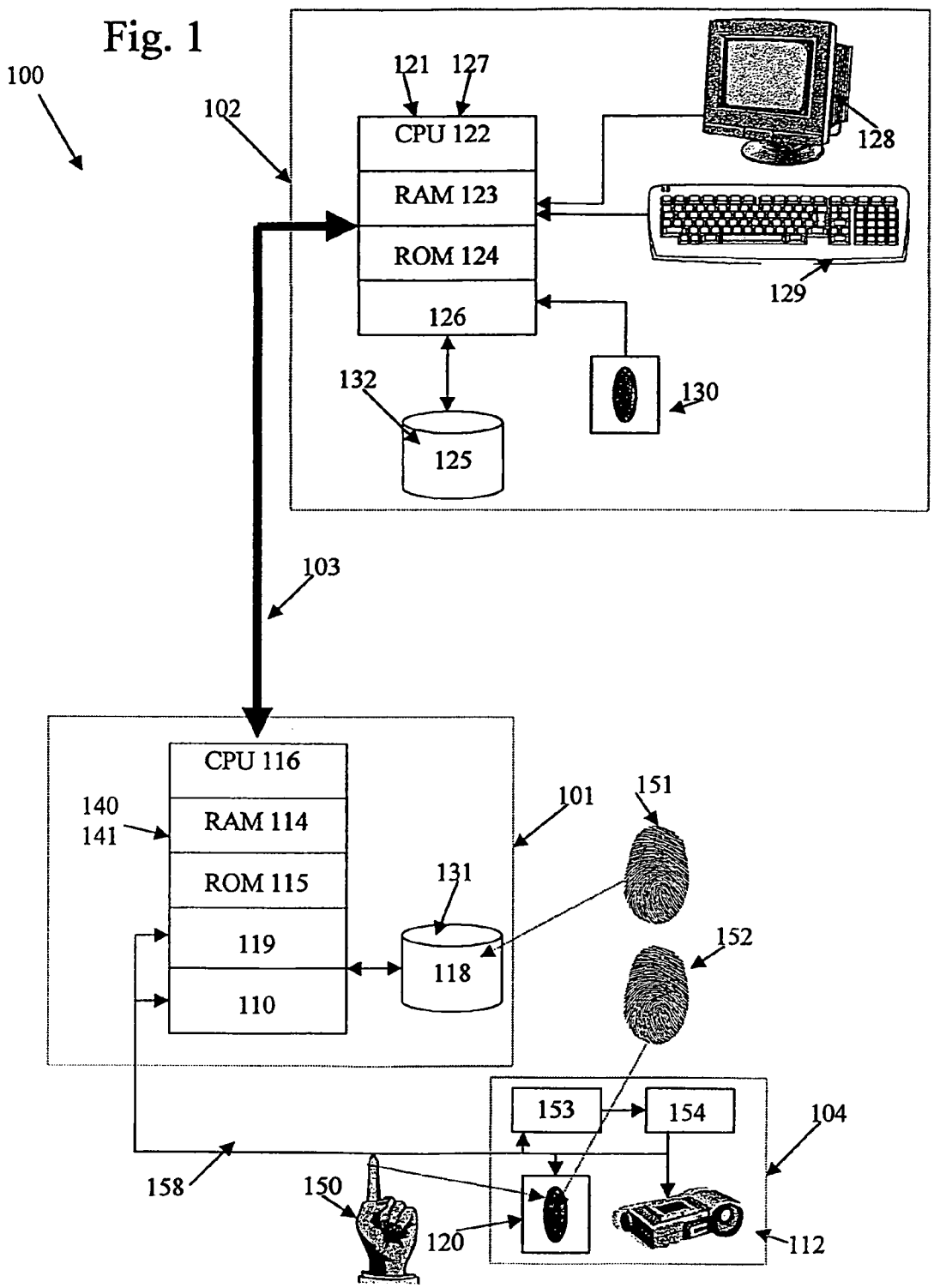
FIG. 1 shows a block diagram of an aspect of the present invention for the verification of fingerprints utilizing a facial image-based heuristic search method.

As particularly shown in FIG. 1, an apparatus for providing fingerprint verification of the present invention is referred to by the numeral 100 and generally comprises a client terminal with associated processing elements and interface electronics 101, an administrative control center and server 102, a communications network for communicating data between the local computer and administrative control center which can include a local area network (LAN) and the Internet 103, and biometric user interface which encloses a fingerprint sensor, and video camera 104.

Referring now to FIG. 1, an apparatus for providing fingerprint verification utilizing a facial image-based heuristic search method includes a local computer 113 having a central processor (CP) 116 well known in the art and commercially available under such trademarks as "Intel® 486", "Pentium®" and "Motorola 68000", conventional non-volatile Random Access Memory (RAM) 114, conventional Read Only Memory (ROM) 115, disk storage device 118, video digitizer circuit board 110 for digitizing facial image data, and sensor interface electronics 119 for communicating digitized fingerprint data and digital control data therethrough. An optical, capacitive or thermal-based fingerprint sensor 120, which can be one of many well known to anyone of ordinary skill in the art and commercially available under such trademarks as Veridicom Open-Touch™, Thomson FingerChip™, Digital Persona U.are.U™ and AuthenTec Inc. FingerLoc™, and a video camera 112 which is well known to anyone of ordinary skill in the art is enclosed in biometric user interface 104. Optional access control electronics 153 electrically associated with sensor interface electronics 119 for actuating an electromechanical lock interface 154, such as an electric strike plate which is commonly utilized in myriad security applications and is well known to anyone of ordinary skill in the art is provided to optionally control access to a facility, computer system or a financial transaction. Access control electronics 153 provides access only when a signal indicative of recognition of an authorized human user is received from local computer 113. A communications cable 158, well known to anyone of ordinary skill in the art, is provided to facilitate the communication of video signals from video camera 112 to video digitizer 110 and digital fingerprint data from fingerprint sensor 120 to sensor interface electronics 119. Communications cable 158 is further characterized as providing electrical power to biometric user interface 104 and digital control signals from sensor interface electronics 119 to access control electronics 153. Fingerprint sensor 120 is situated within the biometric user interface 104 in such a way as to facilitate intimate contact between a thumb or finger of human user 150. The local computer 113 has operably associated therewith facial image matching algorithm 140 which rank orders the biometric database stored on said disk storage device 118 and fingerprint verification software 141 which compares a first digitized human fingerprint 151, stored on said disk storage device 118 with a second digitized human fingerprint 152 acquired in real-time from human user 150 and provides a signal indicative of verification or non-verification of human user 150. The facial image matching algorithm 140 can be one of several algorithms known by anyone who is of ordinary skill in the art such as neural networks 300 or principal component analysis 400. The fingerprint verification software 141 can be of one of several algorithms known by anyone who is of ordinary skill in the art such as minutiae analysis 700 or another equivalent algorithm, the particulars of which are further described hereinafter.

An administrative control center 102 comprised of server 121, video monitor 128, keypad 129, all of which can be selected from myriad off-the-shelf components well known to anyone of ordinary skill in the art, and an optical, capacitive or thermal-based fingerprint sensor 130, which can be one of many well known to anyone of ordinary skill in the art and commercially available under such trademarks as Veridicom OpenTouch™, Thomson FingerChip™, Digital Persona U.are.U™ and AuthenTec Inc. FingerLoc™, is provided as means for the enrollment of an authorized first digitized human fingerprint(s) 151 of human user 150. Although the preferred embodiment of the present invention 100 makes use of a conventional keyboard and personal identification code to provide a secure barrier against unauthorized introduction of surreptitious users, the administrative control center 102 may comprise any hardware or software barrier performing the equivalent function. For example, a touch pad or cipher lock may be used in other embodiments. Administrative control center 102 is preferably located in a secure area and is remotely connectable to one or more client terminals 101 via a communications network for communicating data between the local computer and administrative control center which can include a LAN and the Internet 103.

Server 121 is further characterized as having a central processor (CP) 122 well known in the art and commercially available under such trademarks as "Intel® 486", "Pentium®" and "Motorola 68000", conventional non-volatile Random Access Memory (RAM) 123, conventional Read Only Memory (ROM) 124, disk storage device 125, and fingerprint sensor interface electronics 126 for communicating digitized fingerprint data acquired from fingerprint sensor 130. Administrative control software 127 resident within server 121 is responsible for enrolling new users, deleting old users and generally managing and maintaining the master biometric database 132. The master biometric database 132 resides in fixed disk storage device 125.

Figure 2:
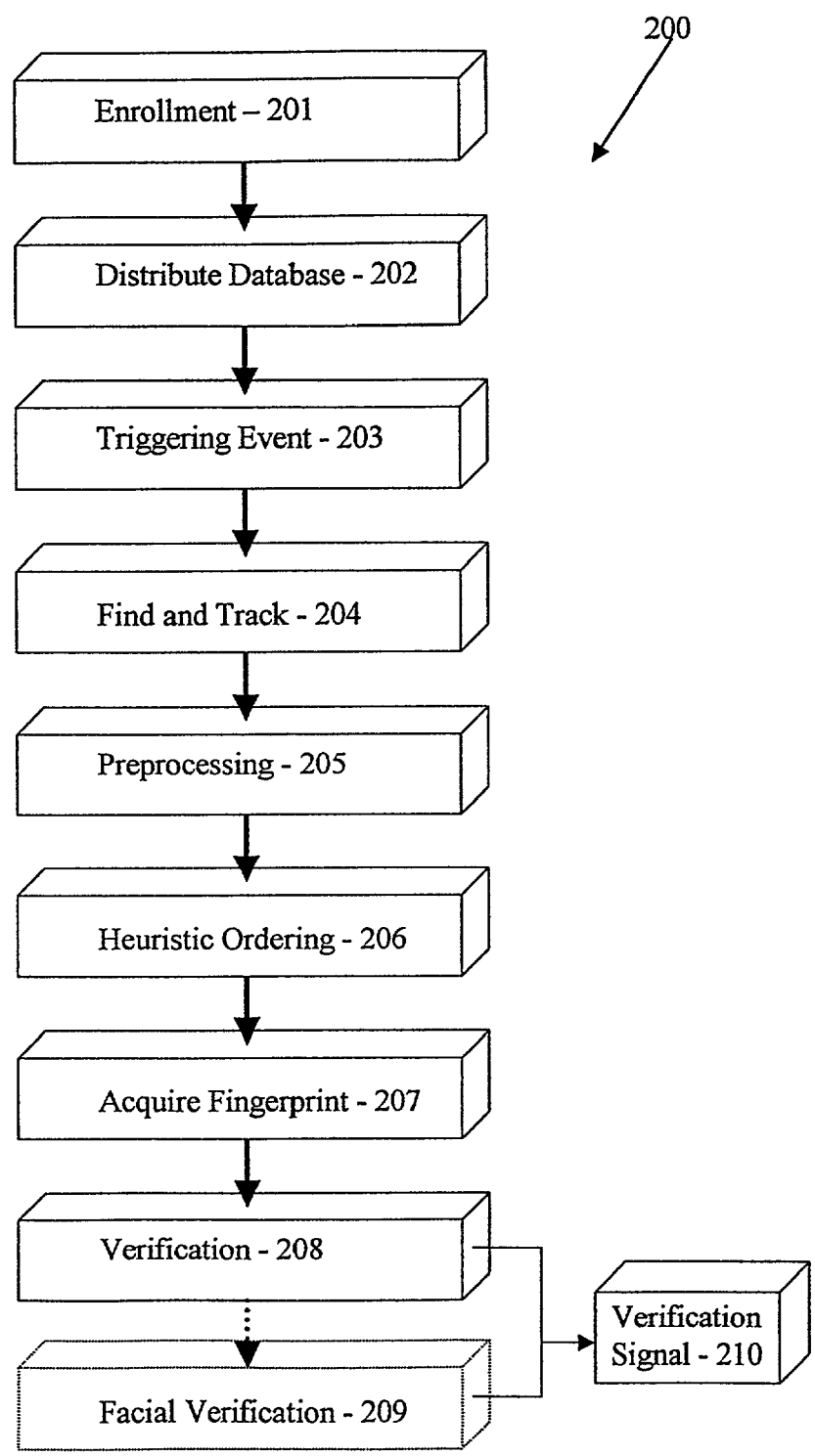
FIG. 2 shows in flow diagram a representation of the general processing steps of the present invention.

Referring now particularly to FIG. 2, a method for verifying a fingerprint of a human user utilizing a facial image-based heuristic search algorithm designated by the numeral 200 begins with the step of enrolling an authorized fingerprint(s) 201 via the administrative control center and server 102. This first digitized fingerprint data 151 is stored in the master biometric database 132 of server 121. Next, the master biometric database 132 is distributed 202 to each of the remote client terminals 101 where the data is stored in a local biometric database 131 in disk storage device 118 and subsequently utilized during the authentication step. Facial images, utilized in organizing the local biometric database 131 to allow efficient fingerprint matching, are not gathered during the initial enrollment of an authorized human user 150, but are gathered at the remote client terminals 101 when the individual terminal is accessed for the first time. This approach enables the system to compensate for lighting variations and differences in the video cameras 112 and other factors related to installation variances. In addition, these reference faces can be updated at the remote client terminals 101 when required such as when a human user grows a beard or moustache or otherwise significantly alters his/her facial appearance.

When a human user 150 attempts, for example, to enter a secure area requiring biometric authentication, upon approaching the biometric user interface 104 video camera 112, as described in detail herein above, senses motion in its field of view which triggers the authentication event 203. Upon triggering authentication event 203, software resident local computer 113 finds and tracks 204 any facial images present within the digitized video image. This face finding/tracking 204 step is necessary to ensure that the motion is caused by a genuine human face and not the product of an artifact such as an arm or hand. Local computer 113 digitizes several facial images and stores them in RAM memory 114. A facial image preprocessing algorithm 205, described in detail hereinafter, is subsequently utilized to normalize, orient and select the highest quality facial images to enable the heuristic ordering step 206, to search and organize the local biometric database 131 in the order of best-to-worst facial image match. The present invention 100 utilizes a facial image matching algorithm 140 which can be neural networks 300 or principal component analysis 400 as described in detail herein below.

If the authorized human user 150 is accessing the client terminal 101 for the first time since enrolling through the administrative control center and server 102, a heuristic ordering 206 would not be possible because facial images associated with said human user would not have previously been stored. For this case, client terminal 101 would associate and store the highest quality facial image of human user 150 with the appropriate data file in the local biometric database 131 whereupon a heuristic ordering 206 can subsequently be performed each time the human user 150 attempts to gain access at the client terminal 101 thereafter. The heuristic ordering step 206 is capable of sorting a large local biometric database 131 very quickly. For example, the present invention 100 utilizing principal component analysis 400 is capable of scanning approximately 20,000 facial images per second and arranging them in their proper order. Typically, principal component analysis 400 can narrow the search for a human user 150 to ten or fewer faces, i.e., human user 150 can be found in the first ten data entries of the re-organized local biometric database 131.

Once the facial images and their associated first digitized fingerprint data 151 have been properly ordered, the human user 150 touches fingerprint sensor 120 with the previously enrolled thumb or finger whereupon real-time second digitized fingerprint data 152 is acquired 207 and stored in RAM memory 114 of local computer 113. Next, the local computer 113 implements a one-to-one fingerprint verification step 208 whereupon each of the first digitized fingerprint data 151 in the heuristically ordered local biometric database 131 is compared to the second digitized fingerprint data 152 acquired in step 207. The present invention 100 utilizes a fingerprint verification algorithm 141, which can be minutiae analysis 700, or an equivalent algorithm as described in detail herein below.

The fingerprint verification algorithm 141 typically compares two digitized fingerprints in 100 milliseconds and has a false acceptance rate (FAR) of approximately 1 in 10,000. Although highly accurate, the algorithm 141 is not efficient for searches involving large databases and could take up to three minutes to search through 2000 individual fingerprints. The present invention 100 overcomes this efficiency limitation by employing step 206 which utilizes facial image sorting to order the local biometric database 131 in its most efficient form After step 206 has been completed, the present invention 100 typically locates and verifies the fingerprint 152 of human user 150 in 500 milliseconds on average regardless of the size of the local biometric database.

Finally, if the second digitized fingerprint data 152 acquired in step 207 is found to match within a predetermined certainty the first digitized fingerprint data 151 verified in step 208, a signal indicative of verification is generated 210 which can then be utilized to actuate an electric lock 154 or permit access to a computer account or financial transaction as described herein above.

In an alternative embodiment utilizing layered biometrics of the present invention 100 an optional facial image verification step 209 can be employed subsequent the one-to-one fingerprint verification step 208 as described herein above. Although facial image verification algorithms typically have a FAR between 1 in 200 and 1 in 1,000 and are not generally suited for accurate verification of a human user, system performance can be significantly enhanced by combining facial verification with another more reliable verification algorithm such as the fingerprint verification algorithm 141. The layering of the two algorithms in a multiple biomteric configuration can yield a significantly higher FAR than can be obtained by either algorithm alone. For example, with the present invention 100, the addition of step 209 subsequent step 208 would yield a FAR approximately equal to 1 in 200 multiplied by 1 in 10,000 or 1 in 2,000,000. Step 209 utilizes the same facial image matching algorithm 140 which can be neural networks 300 or principal component analysis 400 as described herein below and as utilized in the heuristic ordering step 206. When principal component analysis 400 is utilized in comparing two images in a one-to-one mode, the algorithm generates a scalar error with a magnitude that is indicative of the quality of match between the two digitized facial images. A threshold for verification can be preselected so that only match errors below said threshold, generated by the facial image matching algorithm 140, would produce a signal indicative of verification. The heuristic sorting step 206 of the present invention 100 uses this error to rank order the facial images from best to worst match.

There are a variety of methods by which the facial image-based heuristic search element of the present invention 100 can be implemented. Although the methods differ in computational structure, it is widely accepted that they are functionally equivalent. An example of two practical techniques, neural networks 300 and principal component analysis 400, are provided hereinbelow and are depicted in FIG. 3 and FIG. 4 respectively.

Figure 3:
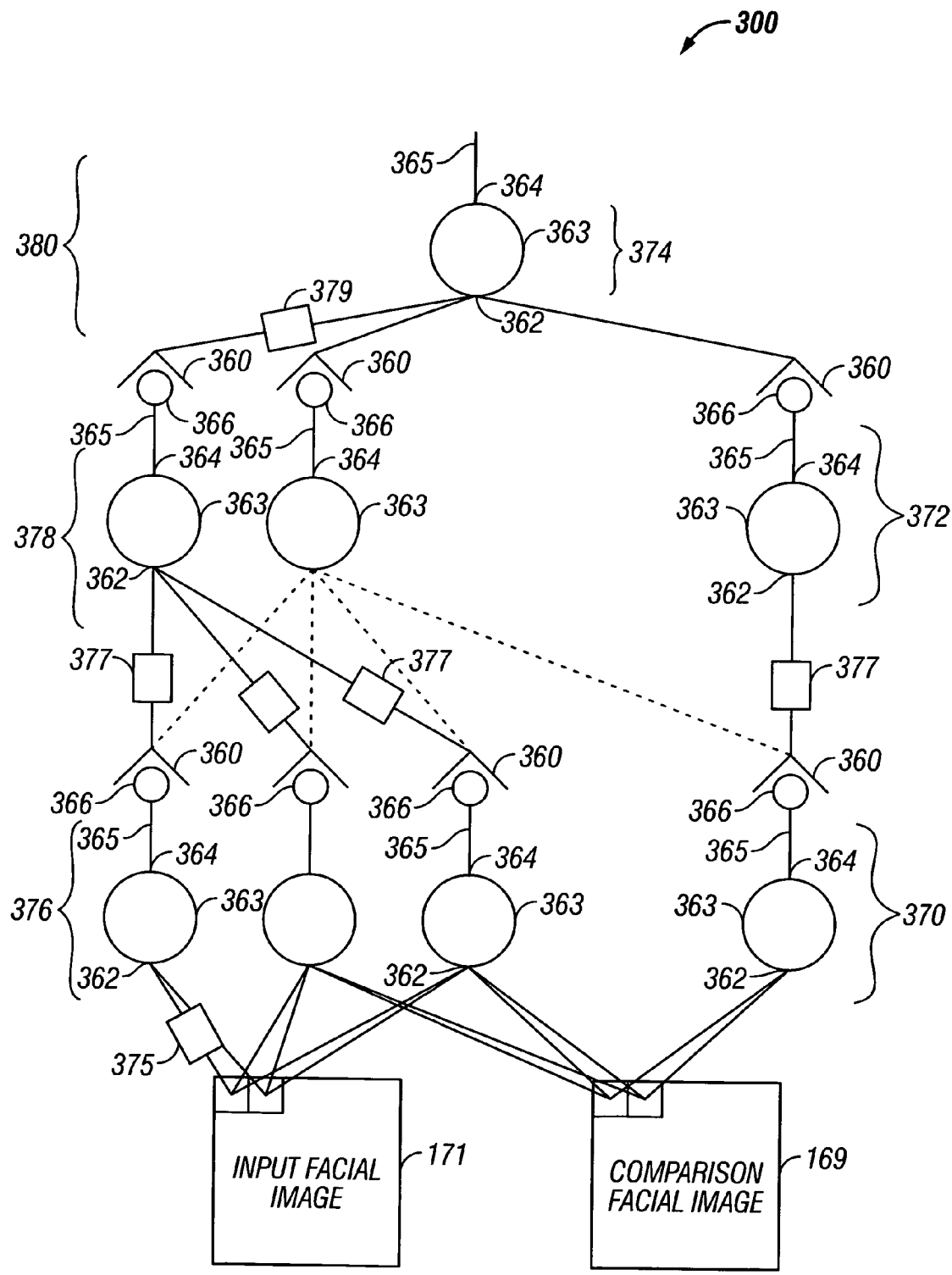
FIG. 3 shows in functional block diagram a representation of a neural network of the present invention.
Figure 4:
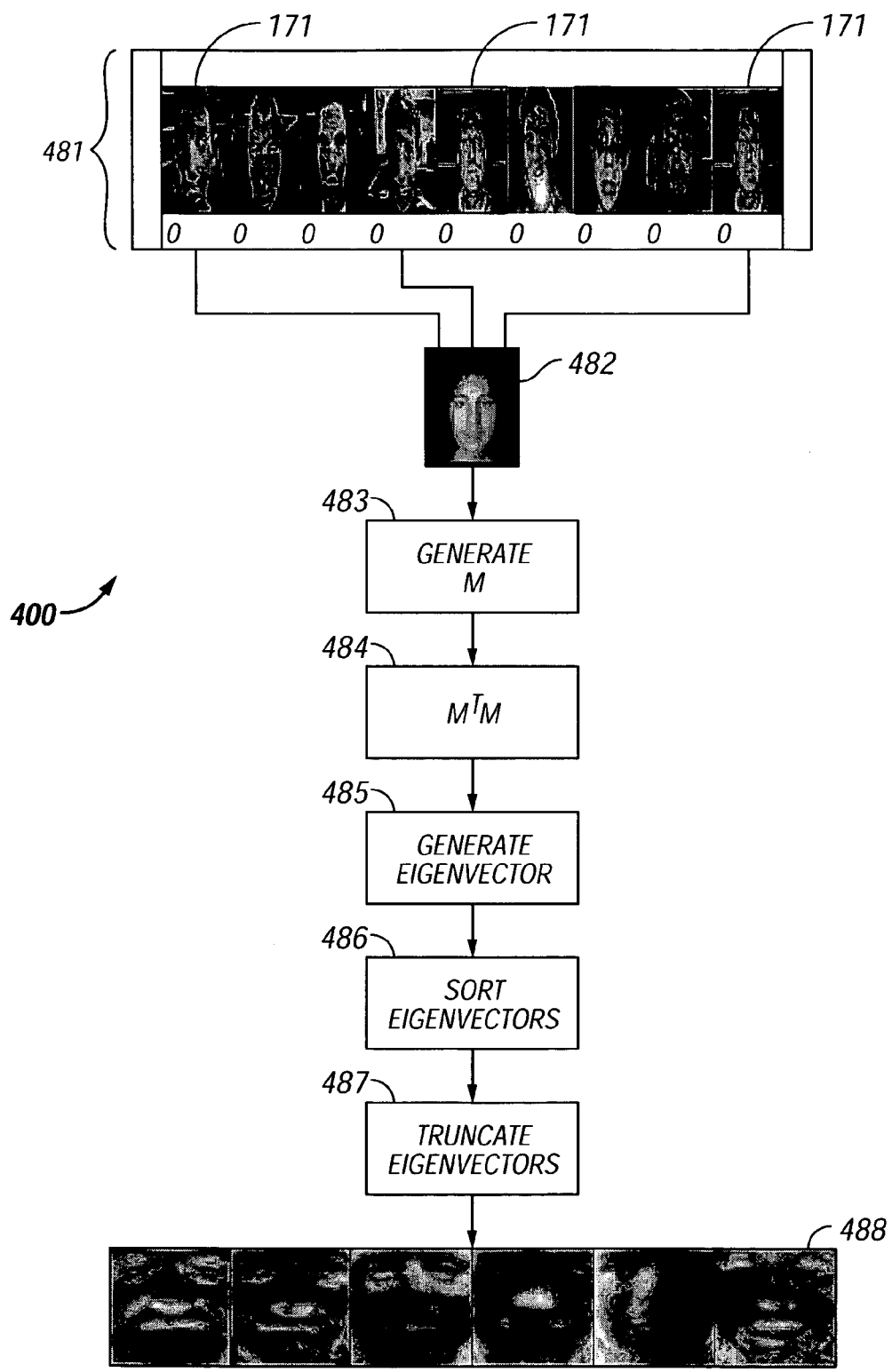
FIG. 4 shows in functional block diagram a representation of principal component analysis (PCA) of the present invention.

As shown in FIG. 3, the neural network 300 includes at least one layer of trained neuron-like units, and preferably at least three layers. The neural network 300 includes input layer 370, hidden layer 372, and output layer 374. Each of the input layer 370, hidden layer 372, and output layer 374 include a plurality of trained neuron-like units 376, 378 and 380, respectively.

Neuron-like units 376 can be in the form of software or hardware. The neuron-like units 376 of the input layer 370 include a receiving channel for receiving human facial image data 171, and comparison facial image data 169 wherein the receiving channel includes a predetermined modulator 375 for modulating the signal.

The neuron-like units 378 of the hidden layer 372 are individually receptively connected to each of the units 376 of the input layer 370. Each connection includes a predetermined modulator 377 for modulating each connection between the input layer 370 and the hidden layer 372.

The neuron-like units 380 of the output layer 374 are individually receptively connected to each of the units 378 of the hidden layer 372. Each connection includes a predetermined modulator 379 for modulating each connection between the hidden layer 372 and the output layer 374. Each unit 380 of said output layer 374 includes an outgoing channel for transmitting the output signal.

Each neuron-like unit 376, 378, 380 includes a dendrite-like unit 360, and preferably several, for receiving incoming signals. Each dendrite-like unit 360 includes a particular modulator 375, 377, 379 which modulates the amount of weight which is to be given to the particular characteristic sensed as described below. In the dendrite-like unit 360, the modulator 375, 377, 379 modulates the incoming signal and subsequently transmits a modified signal 362. For software, the dendrite-like unit 360 comprises an input variable $X_a$ and a weight value $W_a$ wherein the connection strength is modified by multiplying the variables together. For hardware, the dendrite-like unit 360 can be a wire, optical or electrical transducer having a chemically, optically or electrically modified resistor therein.

Each neuron-like unit 376, 378, 380 includes a soma-like unit 363 which has a threshold barrier defined therein for the particular characteristic sensed. When the soma-like unit 363 receives the modified signal 362, this signal must overcome the threshold barrier whereupon a resulting signal is formed. The soma-like unit 363 combines all resulting signals 362 and equates the combination to an output signal 364 indicative of the caliber of match for a human facial image.

For software, the soma-like unit 363 is represented by the sum $\alpha = \Sigma_a X_a W_a - \beta$, where $\beta$ is the threshold barrier. This sum is employed in a Nonlinear Transfer Function (NTF) as defined below. For hardware, the soma-like unit 363 includes a wire having a resistor; the wires terminating in a common point which feeds into an operational amplifier having a nonlinear component which can be a semiconductor, diode, or transistor.

The neuron-like unit 376, 378, 380 includes an axon-like unit 365 through which the output signal travels, and also includes at least one bouton-like unit 366, and preferably several, which receive the output signal from the axon-like unit 365. Bouton/dendrite linkages connect the input layer 370 to the hidden layer 372 and the hidden layer 372 to the output layer 374. For software, the axon-like unit 365 is a variable which is set equal to the value obtained through the NTF and the bouton-like unit 366 is a function which assigns such value to a dendrite-like unit 360 of the adjacent layer. For hardware, the axon-like unit 365 and bouton-like unit 366 can be a wire, an optical or electrical transmitter.

The modulators 375, 377, 379 which interconnect each of the layers of neurons 370, 372, 374 to their respective inputs determines the matching paradigm to be employed by the neural network 300. Human facial image data 171, and comparison facial image data 169 are provided as inputs to the neural network and the neural network then compares and generates an output signal in response thereto which is one of the caliber of match for the human facial image.

It is not exactly understood what weight is to be given to characteristics which are modified by the modulators of the neural network, as these modulators are derived through a training process defined below.

The training process is the initial process which the neural network must undergo in order to obtain and assign appropriate weight values for each modulator. Initially, the modulators 375, 377, 379 and the threshold barrier are assigned small random non-zero values. The modulators can each be assigned the same value but the neural network's learning rate is best maximized if random values are chosen. Human facial image data 171 and comparison facial image data 169 are fed in parallel into the dendrite-like units of the input layer (one dendrite connecting to each pixel in facial image data 171 and 169) and the output observed.

The Nonlinear Transfer Function (NTF) employs a in the following equation to arrive at the output:

$$NTF = 1/[1+e^{-\alpha}]$$

For example, in order to determine the amount weight to be given to each modulator for any given human facial image, the NTF is employed as follows:

If the NTF approaches 1, the soma-like unit produces an output signal indicating a strong match. If the NTF approaches 0, the soma-like unit produces an output signal indicating a weak match.

If the output signal clearly conflicts with the known empirical output signal, an error occurs. The weight values of each modulator are adjusted using the following formulas so that the input data produces the desired empirical output signal.

For the output layer:

$W^*_{kol} = W_{kol} + GE_k Z_{kos}$ $W^*_{kol}$ = new weight value for neuron-like unit k of the outer layer.

$W_{kol}$ = current weight value for neuron-like unit k of the outer layer.

G = gain factor $Z_{kos}$ = actual output signal of neuron-like unit k of output layer.

$D_{kos}$ = desired output signal of neuron-like unit k of output layer.

$E_k = Z_{kos}(1-Z_{kos})(D_{kos}-Z_{kos})$, (this is an error term corresponding to neuron-like unit k of outer layer).

For the hidden layer:

$W^*_{jhl} = W_{jhl} + GE_j Y_{jos}$ $W^*_{jhl}$ = new weight value for neuron-like unit j of the hidden layer.

$W_{jhl}$ = current weight value for neuron-like unit j of the hidden layer.

G = gain factor $Y_{jos}$ = actual output signal of neuron-like unit j of hidden layer.

$E_j = Y_{jos}(1-Y_{jos})\Sigma_k(E_k * W_{kol})$, (this is an error term corresponding to neuron-like unit j of hidden layer over all k units).

For the input layer:

$W^*_{iil} = W_{iil} + GE_i X_{ios}$ $W^*_{iil}$ = new weight value for neuron-like unit I of input layer.

$W_{iil}$ = current weight value for neuron-like unit I of input layer.

G = gain factor $X_{ios}$ = actual output signal of neuron-like unit I of input layer.

$E_i = X_{ios}(1-X_{ios})\Sigma_j(E_j * W_{jhl})$, (this is an error term corresponding to neuron-like unit i of input layer over all j units).

The training process consists of entering new (or the same) exemplar data into neural network 300 and observing the output signal with respect to a known empirical output signal. If the output is in error with what the known empirical output signal should be, the weights are adjusted in the manner described above. This iterative process is repeated until the output signals are substantially in accordance with the desired (empirical) output signal, then the weight of the modulators are fixed.

Upon fixing the weights of the modulators, predetermined face-space memory indicative of the caliber of match are established. The neural network is then trained and can make generalizations about human facial image input data by projecting said input data into face-space memory which most closely corresponds to that data.

The description provided for neural network 300 as utilized in the present invention is but one technique by which a neural network algorithm can be employed. It will be readily apparent to those who are of ordinary skill in the art that numerous neural network model types including multiple (sub-optimized) networks as well as numerous training techniques can be employed to obtain equivalent results to the method as described herein above.

Referring now particularly to FIG. 4, and according to a second preferred embodiment of the present invention, a principal component analysis (PCA) may be implemented as the system's facial image matching algorithm 140. The PCA facial image matching/verification element generally referred to by the numeral 400, includes a set of training images 481 which consists of a plurality of digitized human facial image data 171 representative of a cross section of the population of human faces. In order to utilize PCA in facial image recognition/verification a Karhunen-Loève Transform (KLT), readily known to those of ordinary skill in the art, can be employed to transform the set of training images 481 into an orthogonal set of basis vectors or eigenvectors. In the present invention, a subset of these eigenvectors, called eigenfaces, comprise an orthogonal coordinate system, detailed further herein, and referred to as face-space.

The implementation of the KLT is as follows: An average facial image 482, representative of an average combination of each of the training images 481 is first generated. Next, each of the training images 481 are subtracted from the average face 482 and arranged in a two dimensional matrix 483 wherein one dimension is representative of each pixel in the training images, and the other dimension is representative of each of the individual training images. Next, the transposition of matrix 483 is multiplied by matrix 483 generating a new matrix 484. Eigenvalues and eigenvectors 485 are thenceforth calculated from the new matrix 484 using any number of standard mathematical techniques that will be well known by those of ordinary skill in the art such as Jacobi's method. Next, the eigenvalues and eigenvectors 485 are sorted 486 from largest to smallest whereupon the set is truncated to only the first several eigenvectors 487 (e.g. between 5 and 20 for acceptable performance). Lastly, the truncated eigenvalues and eigenvectors 487 are provided as outputs 488. The eigenvalues and eigenvectors 488 and average face 482 can then be stored inside the RAM memory 114 in the local computer 113 for use in recognizing or verifying facial images.

Figure 5:
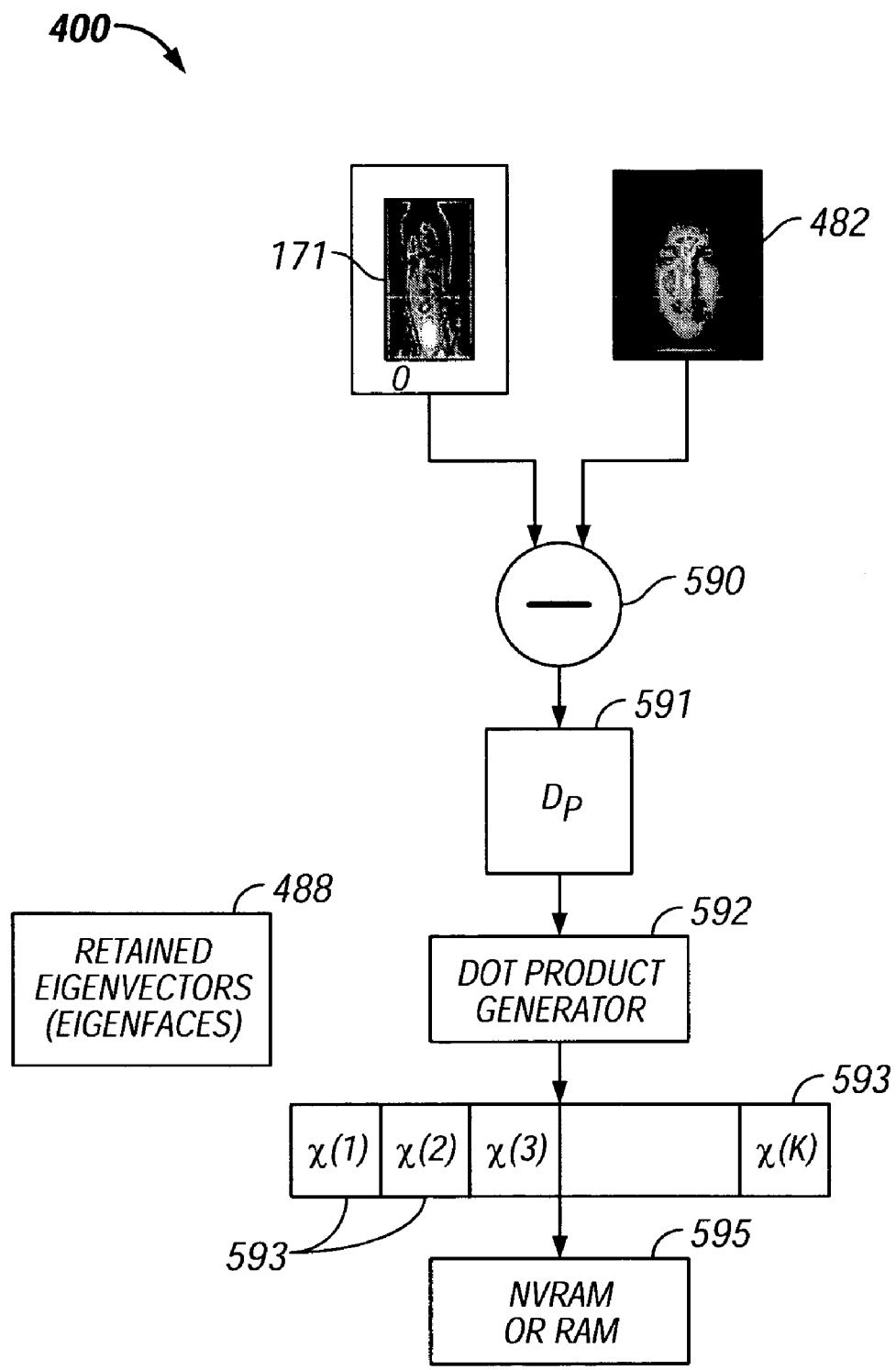
FIG. 5 shows a representation of a human facial image transformation of the present invention.

Referring now to FIG. 5, for the PCA algorithm 400 facial image matching/verification is accomplished by first finding and converting a human facial image to a small series of coefficients which represent coordinates in a face-space that are defined by the orthogonal eigenvectors 488. Initially a preprocessing step, defined further herein below, is employed to locate, align and condition the digital video images. Facial images are then projected as a point in face-space. The caliber of match for any human user 150 is provided by measuring the Euclidean distance between two such points in face-space. In addition, if the coefficients generated as further described below represent points in face-space that are within a predetermined acceptance distance, a signal indicative of verification is generated. If; on the other hand, the two points are far apart, a signal indicative on non-verification is generated. Although this method is given as a specific example of how the PCA 400 algorithm works, the mathematical description and function of the algorithm is equivalent to that of the neural network 300 algorithm. The projection of the faces into face-space is accomplished by the individual neurons and hence the above description accurately relates an analogous way of describing the operation of neural network 300.

Again using the PCA 400 algorithm as an example, a set of coefficients for any given human facial image is produced by taking the digitized human facial image 171 of a human user 150 and subtracting 590 the average face 482. Next, the dot product 591 between the difference image and one eigenvector 488 is computed by dot product generator 592. The result of the dot product with a single eigenface is a numerical value 593 representative of a single coefficient for the image 171. This process is repeated for each of the set of eigenvectors 488 producing a corresponding set of coefficients 594 which can then be stored 595 in the disk storage device 118 operably associated with local computer 113 described herein above. Because there are relatively few coefficients necessary to represent a set of reference faces of a single human user 150, the storage space requirements are minimal and on the order of 100 bytes per stored encoded facial image.

As further described below, said first human facial images of a human user 150 are stored in disk storage device 118 during the training process. Each time the facial image of human user 150 is acquired by the video camera 112 thereafter, a said second human facial image of said human user 150 is acquired, the facial image is located, aligned, processed and compared to every said first human facial image in the database by PCA 400 or neural network 300.

Thus, the technique as described above provides the means by which two said facial image sets can be accurately compared and a matching error signal can be generated therefrom.

The preferred method of acquiring and storing the aforesaid facial images of said human user, begins with the human user 150, providing one and preferably four to eight facial images of him/herself to be utilized as templates for all subsequent sorting or verification events. To accomplish this, said authorized human user approaches the biometric user interface 104 and touches fingerprint sensor 120. If no facial images have been previously stored, or if the facial characteristics of human user 150 have changed significantly, local computer 113 performs an exhaustive search of the local biometric database 131 to verify the identity of said human user based on the fingerprint only. Once the individual is verified, local computer 113 enters a "learning mode" and subsequently acquires several digitized first human facial images of the human user 150 through the use of CCD video camera 112 and digitizer 110. These first human facial images are preprocessed, the highest quality images selected and thenceforth reduced to coefficients and stored in the disk storage device 118 of local computer 113. These selected fist human facial images will be utilized thereafter as the reference faces. Thereafter when said authorized human user 150 approaches biometric user interface 104 to initiate a biometric verification sequence, the human user 150 trigger's motion detection and face finding algorithms incorporated in the facial image matching algorithm 140 as described in detail herein below. At this time, video camera 112 begins acquiring second human facial images of the human user 150 and converts said second human facial images to digital data via digitizer 110. The digitized second human facial images obtained thereafter are stored in the RAM memory 114 of computer 113 as comparison faces.

Once the said second human facial image(s) has been stored in computer 113, the facial image matching algorithm 140, either neural network 300 or PCA 400 can be employed to perform a comparison between said stored first human facial image and said acquired second human facial image and produce an output signal in response thereto indicative of caliber of match of the human user 150.

Figure 6:
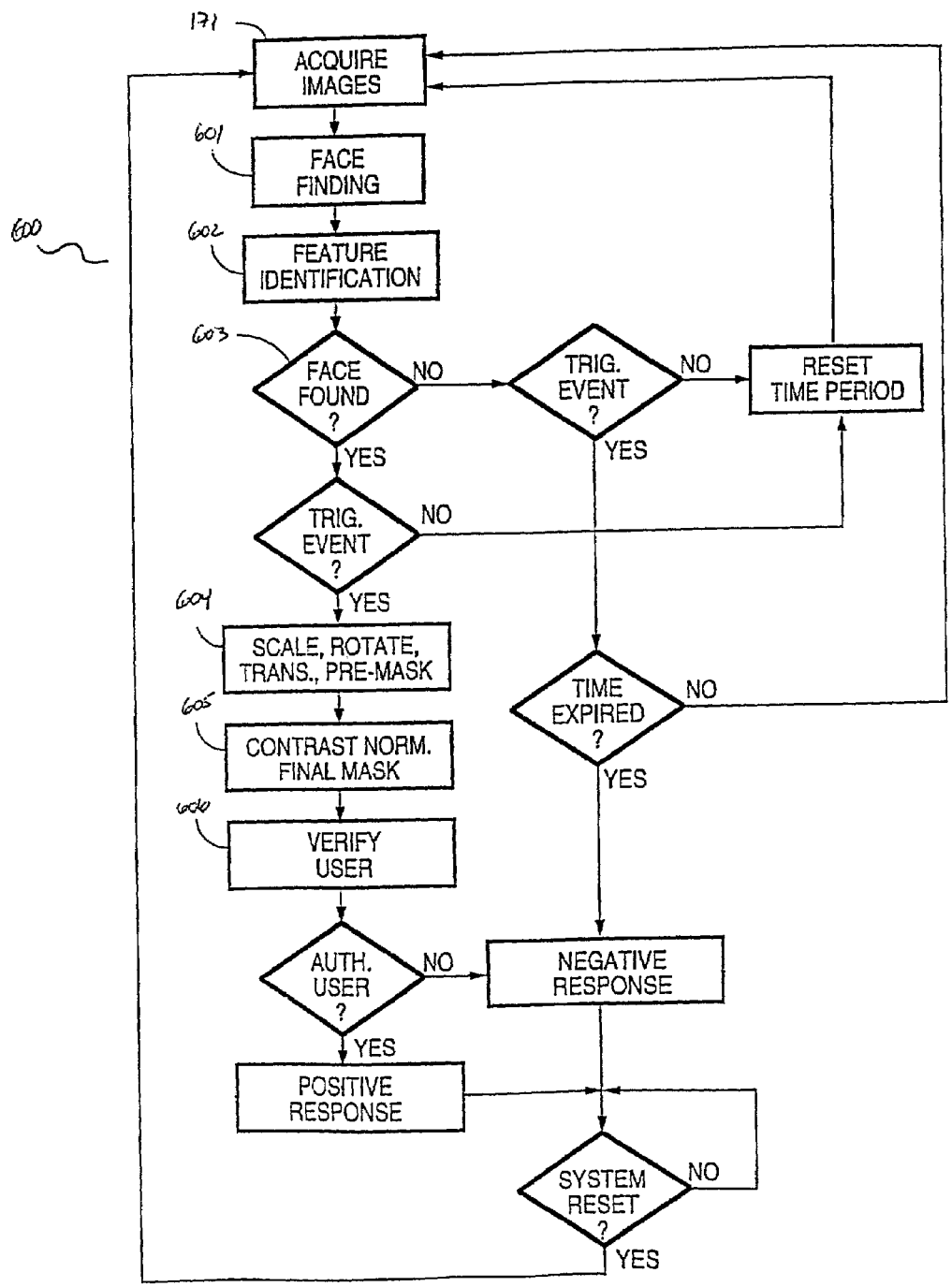
FIG. 6 shows exemplar steps utilized by the face recognition software engine in preprocessing facial image data prior to recognition/identification.

As previously stated herein above, and referring now to FIG. 6, a preprocessing function 600 must typically be implemented in order to achieve efficient and accurate processing by the chosen facial image matching algorithm 140 of acquired human facial image data 171. Whether utilizing a neural network 300, PCA 400 or another equivalent face recognition software algorithm, the preprocessing function generally comprises elements adapted for (1) face finding 601, (2) feature extraction 602, (3) determination of the existence within the acquired data of a human facial image 603, (4) scaling, rotation, translation and pre-masking of the captured human image data 604, and (5) contrast normalization and final masking 605. Although each of these preprocessing function elements 601, 602, 603, 604, 605 is described in detail further herein, those of ordinary skill in the art will recognize that some or all of these elements may be dispensed with depending upon the complexity of the chosen implementation of the facial image matching algorithm 140 and desired overall system attributes.

In the initial preprocessing step of face finding 601, objects exhibiting the general character of a human facial image are located within the acquired image data 171 where after the general location of any such existing object is tracked. Although those of ordinary skill in the art will recognize equivalent alternatives, three exemplary face finding techniques are (1) baseline subtraction and trajectory tracking, (2) facial template subtraction, or the lowest error method, and (3) facial template cross-correlation.

In baseline subtraction and trajectory tracking, a first, or baseline, acquired image is generally subtracted, pixel value-by-pixel value, from a second, later acquired image. As will be apparent to those of ordinary skill in the art, the resulting difference image will be a zero-value image if there exists no change in the second acquired image with respect to the first acquired image. However, if the second acquired image has changed with respect to the first acquired image, the resulting difference image will contain nonzero values for each pixel location in which change has occurred. Assuming that a human user 150 will generally be non-stationary with respect to the system's camera 112, and will generally exhibit greater movement than any background object, the baseline subtraction technique then tracks the trajectory of the location of a subset of the pixels of the acquired image representative of the greatest changes. During initial preprocessing 601, 602, this trajectory is deemed to be the location of a likely human facial image.

In facial template subtraction, or the lowest error method, a ubiquitous facial image, i.e. having only nondescript facial features, is used to locate a likely human facial image within the acquired image data. Although other techniques are available, such a ubiquitous facial image may be generated as a very average facial image by summing a large number of facial images. According to the preferred method, the ubiquitous image is subtracted from every predetermined region of the acquired image, generating a series of difference images. As will be apparent to those of ordinary skill in the art, the lowest error in difference will generally occur when the ubiquitous image is subtracted from a region of acquired image data containing a similarly featured human facial image. The location of the region exhibiting the lowest error, deemed during initial preprocessing 601, 602 to be the location of a likely human facial image, may then be tracked.

In facial template cross-correlation, a ubiquitous image is cross-correlated with the acquired image to find the location of a likely human facial image in the acquired image. As is well known to those of ordinary skill in the art, the cross-correlation function is generally easier to conduct by transforming the images to the frequency domain, multiplying the transformed images, and then taking the inverse transform of the product. A two-dimensional Fast Fourier Transform (2D-FFT), implemented according to any of myriad well known digital signal processing techniques, is therefore utilized in the preferred embodiment to first transform both the ubiquitous image and acquired image to the frequency domain. The transformed images are then multiplied together. Finally, the resulting product image is transformed, with an inverse FFT, back to the time domain as the cross-correlation of the ubiquitous image and acquired image. As is known to those of ordinary skill in the art, an impulsive area, or spike, will appear in the cross-correlation in the area of greatest correspondence between the ubiquitous image and acquired image. This spike, deemed to be the location of a likely human facial image, is then tracked during initial preprocessing 601, 602.

Once the location of a likely human facial image is known, feature identification 602 is employed to determine the general characteristics of the thought-to-be human facial image for making a threshold verification that the acquired image data contains a human facial image and in preparation for image normalization. Feature identification preferably makes use of eigenfeatures, generated according to the same techniques previously detailed for generating eigenfaces, to locate and identify human facial features such as the eyes, nose and mouth. The relative locations of these features are then evaluated with respect to empirical knowledge of the human face, allowing determination of the general characteristics of the thought-to-be human facial image as will be understood further herein. As will be recognized by those of ordinary skill in the art, templates may also be utilized to locate and identify human facial features according to the time and frequency domain techniques described for face finding 601.

Once the initial preprocessing function elements 601, 602 have been accomplished, the system is then prepared to make an evaluation 603 as to whether there exists a facial image within the acquired data, i.e. whether a human user 150 is within the field of view of the system's camera 112. According to the preferred method, the image data is either accepted or rejected based upon a comparison of the identified feature locations with empirical knowledge of the human face. For example, it is to be generally expected that two eyes will be found generally above a nose, which is generally above a mouth. It is also expected that the distance between the eyes should fall within some range of proportion to the distance between the nose and mouth or eyes and mouth or the like. Thresholds are established within which the location or proportion data must fall in order for the system to accept the acquired image data as containing a human facial image. If the location and proportion data falls within the thresholds, preprocessing continue. If, however, the data falls without the thresholds, the acquired image is discarded.

Threshold limits may also be established for the size and orientation of the acquired human facial image in order to discard those images likely to generate erroneous recognition results due to poor presentation of the user 150 to the system's camera 112. Such errors are likely to occur due to excessive permutation, resulting in overall loss of identifying characteristics, of the acquired image in the morphological processing 604, 605 required to normalize the human facial image data, as detailed further herein. Applicant has found that it is simply better to discard borderline image data and acquire a new better image. For example, the system 100 may determine that the image acquired from a user 150 looking only partially at the camera 112, with head sharply tilted and at a large distance from the camera 112, should be discarded in favor of attempting to acquire a better image, i.e. one which will require less permutation 604, 605 to normalize. Those of ordinary skill in the art will recognize nearly unlimited possibility in establishing the required threshold values and their combination in the decision making process. The final implementation will be largely dependent upon empirical observations and overall system implementation.

Although the threshold determination element 603 is generally required for ensuring the acquisition of a valid human facial image prior to subsequent preprocessing 604, 605 and eventual attempts by the facial image matching algorithm 140 to verify 606 the recognition status of a user 150, it is noted that the determinations made may also serve to indicate a triggering event condition. As previously stated, one of the possible triggering event conditions associated with the apparatus is the movement of a user 150 within the field of view of the system's camera 112. Accordingly, much computational power may be conserved by determining the existence 603 of a human facial image as a preprocessing function—continuously conducted as a background process. Once verified as a human facial image, the location of the image within the field of view of the camera 112 may then be relatively easily monitored by the tracking functions detailed for face finding 601. The system 100 may thus be greatly simplified by making the logical inference that an identified known user 150 who has not moved out of sight, but who has moved, is the same user 150.

After the system 100 determines the existence of human facial image data, and upon triggering of a matching/verification event, the human facial image data is scaled, rotated, translated and pre-masked 604, as necessary. Applicant has found that the various facial image matching algorithms 140 perform with maximum efficiency and accuracy if presented with uniform data sets. Accordingly, the captured image is scaled to present to the facial image matching algorithm 140 a human facial image of substantially uniform size, largely independent of the user's distance from the camera 112. The captured image is then rotated to present the image in a substantially uniform orientation, largely independent of the user's orientation with respect to the camera 112. Finally, the captured image is translated to position the image preferably into the center of the acquired data set in preparation for masking, as will be detailed further herein. Those of ordinary skill in the art will recognize that scaling, rotation and translation are very common and well-known morphological image processing functions that may be conducted by any number of well known methods. Once the captured image has been scaled, rotated and translated, as necessary, it will reside within a generally known subset of pixels of acquired image data. With this knowledge, the captured image is then readily pre-masked to eliminate the background viewed by the camera 112 in acquiring the human facial image. With the background eliminated, and the human facial image normalized, much of the potential error can be eliminated in contrast normalization 605, detailed further herein, and eventual matching 606 by the facial image matching algorithm 140.

Because it is to be expected that the present invention 100 will be placed into service in widely varying lighting environments, the preferred embodiment includes the provision of a contrast normalization 605 function for eliminating adverse consequences concomitant the expected variances in user illumination. Although those of ordinary skill in the art will recognize many alternatives, the preferred embodiment of the present invention 100 comprises a histogram specification function for contrast normalization. According to this method, a histogram of the intensity and/or color levels associated with each pixel of the image being processed is first generated. The histogram is then transformed, according to methods well known to those of ordinary skill in the art, to occupy a predetermined shape. Finally, the image being processed is recreated with the newly obtained intensity and/or color levels substituted pixel-by-pixel. As will be apparent to those of ordinary skill in the art, such contrast normalization 605 allows the use of a video camera 112 having very wide dynamic range in combination with a video digitizer 110 having very fine precision while arriving at an image to be verified having only a manageable number of possible intensity and/or pixel values. Finally, because the contrast normalization 605 may reintroduce background to the image, it is preferred that a final masking 605 of the image be performed prior to facial image matching 606. After final masking, the image is ready for matching 606 as described herein above.

There are a variety of methods by which the fingerprint verification element of the present invention 100 can be implemented. Although the methods differ in computational structure, it is widely accepted that they are functionally equivalent. An example of one practical technique, minutiae analysis 700, is provided hereinbelow and is depicted in FIG. 7.

Figure 7:
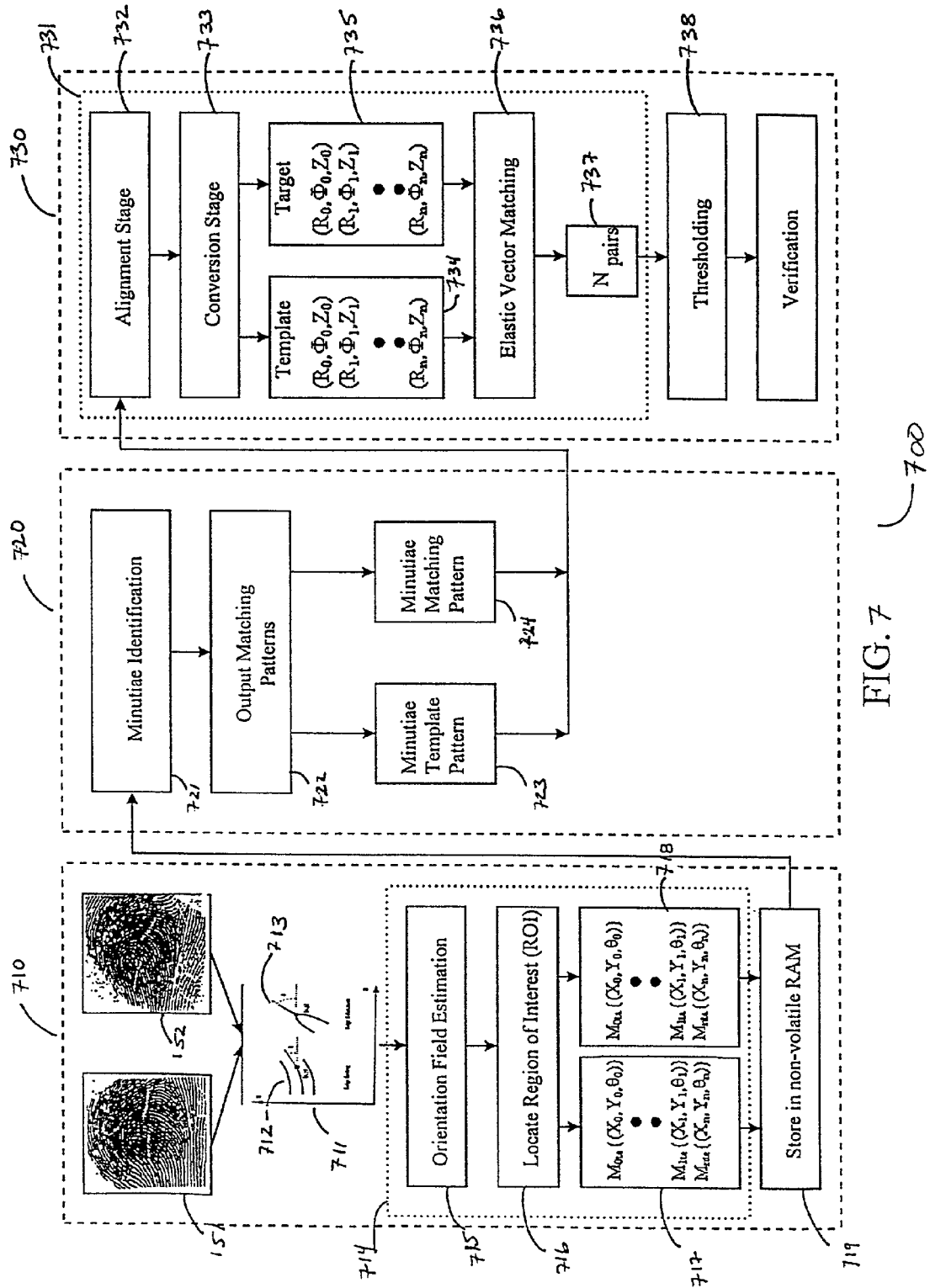
FIG. 7 shows in functional block diagram a representation of minutiae analysis of the present invention.

As shown in FIG. 7, the minutiae analysis 700, appropriate for implementation of the present invention 100 includes the steps of minutiae detection 710, minutiae extraction 720 and minutia matching 730. After a human fingerprint 151 (template) or 152 (target) has been acquired and digitized as described in steps 201 and 207 herein above, local ridge characteristics 711 are detected. The two most prominent local ridge characteristics 711, called minutiae, are ridge ending 712 and ridge bifurcation 713. Additional minutiae suitable for inclusion in minutiae analysis 700 exist such as "short ridge", "enclosure", and "dot" and may also be utilized by the present invention 100. A ridge ending 712 is defined as the point where a ridge ends abruptly. A ridge bifurcation 713 is defined as the point where a ridge forks or diverges into branch ridges. A fingerprint 151, 152 typically contains about 75 to 125 minutiae. The next step in minutiae analysis 700 of the present invention 100 involves identifying and storing the location of the minutiae 712, 713 utilizing a minutiae cataloging algorithm 714. In minutiae cataloging 714, the local ridge characteristics from step 711 undergo an orientation field estimation 715 in which the orientation field of the input local ridge characteristics 711 are estimated and a region of interest 716 is identified. At this time, individual minutiae 712, 713 are located, and an X and Y coordinate vector representing the position of minutiae 712, 713 in two dimensional space as well as an orientation angle θ is identified for template minutiae 717 and target minutiae 718. Each are stored 719 in random access memory (RAM) 114.

Next, minutiae extraction 720 is performed for each detected minutiae previously stored in step 719 above. Each of the stored minutiae 719 are analyzed by a minutiae identification algorithm 721 to determine if the detected minutiae 719 are one of a ridge ending 712 or ridge bifurcation 713. The matching-pattern vectors which are used for alignment in the minutiae matching step 730, are represented as two-dimensional discrete signals that are normalized by the average inter-ridge distance. A matching-pattern generator 722 is employed to produce standardized vector patterns for comparison. The net result of the matching-pattern generator 722 are minutiae matching patterns 723 and 724. With respect to providing verification of a fingerprint as required by the present invention 100, minutiae template pattern 723 is produced for the enrolled fingerprint 151 of human user 150 and minutiae target pattern 724 is produced for the real-time fingerprint 152 of human user 150.

Subsequent minutiae extraction 720, the minutiae matching 730 algorithm determines whether or not two minutiae matching patterns 723, 724 are from the same finger of said human user 150. A similarity metric between two minutiae matching patterns 723, 724 is defined and a thresholding 738 on the similarity value is performed. By representing minutiae matching patterns 723, 724 as two-dimensional "elastic" point patterns, the minutiae matching 730 may be accomplished by "elastic" point pattern matching, as is understood by anyone of ordinary skill in the art, as long as it can automatically establish minutiae correspondences in the presence of translation, rotation and deformations, and detect spurious minutiae and missing minutiae. An alignment-based "elastic" vector matching algorithm 731 which is capable of finding the correspondences between minutiae without resorting to an exhaustive search is utilized to compare minutiae template pattern 723, with minutiae target pattern 724. The alignment-based "elastic" matching algorithm 731 decomposes the minutiae matching into three stages: (1) An alignment stage 732, where transformations such as translation, rotation and scaling between a template pattern 723 and target pattern 724 are estimated and the target pattern 724 is aligned with the template pattern 723 according to the estimated parameters; (2) A conversion stage 733, where both the template pattern 723 and the target pattern 724 are converted to vectors 734 and 735 respectively in the polar coordinate system; and (3) An "elastic" vector matching algorithm 736 is utilized to match the resulting vectors 734, 735 wherein the normalized number of corresponding minutiae pairs 737 is reported. Upon completion of the alignment-based "elastic" matching 731, a thresholding 738 is thereafter accomplished. In the event the number of corresponding minutiae pairs 737 is less than the threshold 738, a signal indicative of non-verification is generated by computer 113. Conversely, in the event the number of corresponding minutiae pairs 737 is greater than the threshold 738, a signal indicative of verification is generated by computer 113. Either signal is communicated by computer 113 to interface electronics 153 via communication cable 158 as described in detail herein above.

The above described embodiments are set forth by way of example and are not for the purpose of limiting the scope of the present invention. It will be readily apparent to those or ordinary skill in the art that obvious modifications, derivations and variations can be made to the embodiments without departing from the scope of the invention. For example, the facial image-based heuristic search algorithms described herein above as either a neural network 300 or principal component analysis 400 could also be one of a statistical based system, template or pattern matching, or even rudimentary feature matching whereby the features of the facial images are analyzed. Similarly, the fingerprint verification algorithms described in detail above as minutiae analysis 700 could be one of many other algorithms well known to anyone of ordinary skill in the art. Accordingly, the claims appended hereto should be read in their fill scope including any such modifications, derivations and variations.

What is claimed is:

1. A one-to-many biometric verification system utilizing facial image comparisons to enhance the efficiency of a fingerprint verification analysis, the verification system comprising:
   a storage device containing a database of facial image templates and fingerprint templates acquired from a plurality of enrolled individuals, said database associating each facial image template with at least one corresponding fingerprint template acquired from the same enrolled individual;
   a camera for obtaining a newly acquired digital representation of a human facial image;
   a fingerprint sensor for obtaining a newly acquired digital representation of a human fingerprint;
   a processor associated with said storage device, camera, and fingerprint sensor; and
   software resident on said processor for comparing the newly acquired digital representation of a human facial image with the stored facial image templates, identifying a subset of more than one, but less than all, of said stored facial image templates that most closely match the newly acquired digital representation of a human facial image, then comparing the newly acquired digital representation of a human fingerprint with the fingerprint templates associated with said subset, and producing an output signal indicative of whether an enrolled individual is recognized;
   wherein the software is adapted to produce an output signal indicative of whether an enrolled individual is recognized without relying on a non-biometric discriminator to convert a one-to-many verification task to a one-to-one verification task;
   wherein the software is also adapted to recognize an enrolled individual solely from fingerprint comparisons if no facial image templates are stored in the database.

2. The verification system of claim 1, wherein the software, if it has recognized an enrolled individual solely from fingerprint comparisons but not from facial image comparisons, is adapted to enter a learning mode in which it generates a new facial image template from said newly acquired digital representation of a human facial image and add it to the database.

3. The verification system of claim 2, further comprising an administrative control center and a plurality of remote client terminals, each remote client terminal comprising a storage device, camera, fingerprint sensor, and processor as set forth in claim 1, wherein:
   the administrative control center is adapted to enroll a plurality of individuals by generating templates of their fingerprints and storing them in a master biometric database, the master biometric database being distributed to each of the remote client terminals for storage on their respective storage devices; and
   each remote client terminal generating facial image templates from their respective cameras for inclusion in their respective databases;
   whereby the verification system compensates for lighting, camera setup, and other environmental variations at the remote client terminals that variably affect quality of image data acquisition.

4. A one-to-many biometric verification system utilizing facial image comparisons to enhance the efficiency of a fingerprint verification analysis, the verification system comprising:
   a storage device containing a database of facial image templates and fingerprint templates acquired from a plurality of enrolled individuals, said database associating each facial image template with at least one corresponding fingerprint template acquired from the same enrolled individual;
   a camera for obtaining a newly acquired digital representation of a human facial image;
   a fingerprint sensor for obtaining a newly acquired digital representation of a human fingerprint;
   a processor associated with said storage device, camera, and fingerprint sensor; and
   software resident on said processor for comparing the newly acquired digital representation of a human facial image with the stored facial image templates, identifying a subset of more than one, but less than all, of said stored facial image templates that most closely match the newly acquired digital representation of a human facial image, then comparing the newly acquired digital representation of a human fingerprint with the fingerprint templates associated with said subset, and producing an output signal indicative of whether an enrolled individual is recognized;
   wherein the software is adapted to produce an output signal indicative of whether an enrolled individual is recognized without relying on a non-biometric discriminator to convert a one-to-many verification task to a one-to-one verification task;

wherein the subset comprises no more than ten facial image templates that most closely match the newly acquired digital representation of a human facial image.

5. A one-to-many biometric verification system utilizing facial image comparisons to enhance the efficiency of a fingerprint verification analysis, the verification system comprising:

a storage device containing a database of facial image templates and fingerprint templates acquired from a plurality of enrolled individuals, said database associating each facial image template with at least one corresponding fingerprint template acquired from the same enrolled individual;

a camera for obtaining a newly acquired digital representation of a human facial image;

a fingerprint sensor for obtaining a newly acquired digital representation of a human fingerprint;

a processor associated with said storage device, camera, and fingerprint sensor;

software resident on said processor for comparing the newly acquired digital representation of a human facial image with the stored facial image templates, identifying a subset of more than one, but less than all, of said stored facial image templates that most closely match the newly acquired digital representation of a human facial image, then comparing the newly acquired digital representation of a human fingerprint with the fingerprint templates associated with said subset, and producing an output signal indicative of whether an enrolled individual is recognized;

wherein the software is adapted to produce an output signal indicative of whether an enrolled individual is recognized without relying on a non-biometric discriminator to convert a one-to-many verification task to a one-to-one verification task;

wherein the camera is a video camera having a field of view and being adapted to acquire a stream of images, and wherein the software is adapted to sense motion in the field of view to trigger an image preprocessing routine in which the software identifies whether the motion is caused by a human face, and if the motion is determined to be caused by a human face, to identify at least one highest quality facial image from said stream of images for comparison with said stored facial image templates.

* * * * *